United States Patent [19]

Madonia

[11] Patent Number: 4,523,405
[45] Date of Patent: Jun. 18, 1985

[54] SUPPORT STAKE FOR PLANTS

[76] Inventor: Ciro Madonia, 1390 Beuafort Dr., Burlington, Ontario, Canada

[21] Appl. No.: 534,500

[22] Filed: Sep. 21, 1983

Related U.S. Application Data

[63] Continuation-in-part of Ser. No. 320,139, Nov. 12, 1981, abandoned.

[51] Int. Cl.³ .......................... A01G 17/04; B32B 1/00
[52] U.S. Cl. ........................................ 47/47; 428/174; 428/192
[58] Field of Search ............... 428/174, 192, 397, 399, 428/400; 47/46, 47, 42, 43; 135/15 PQ

[56] References Cited

U.S. PATENT DOCUMENTS

| | | | |
|---|---|---|---|
| 3,293,809 | 12/1966 | Daline | 47/47 |
| 3,875,699 | 4/1975 | Lamarre | 47/46 |
| 4,256,685 | 3/1981 | Vassar | 264/177 R |

FOREIGN PATENT DOCUMENTS

| | | |
|---|---|---|
| 1962305 | 6/1971 | Fed. Rep. of Germany . |
| 2082656 | 12/1971 | France . |
| 600634 | 12/1959 | Italy ........................................ 47/46 |
| 1590231 | 5/1981 | United Kingdom . |

Primary Examiner—Paul J. Thibodeau
Attorney, Agent, or Firm—D. Eggins

[57] ABSTRACT

A stake for supporting plants is provided having a high stiffness cross-section modulus including lobed surfaces for attachment of soft stemmed plants thereto and serrated tying surfaces for locating stem ties in non-sliding relation, the stake being of plastic and suited for manufacture by extrusion. In one embodiment a driving cap is provided to facilitate insertion of the stake into the ground. The stake ends are symetrically pointed to facilitate use.

3 Claims, 7 Drawing Figures

SUPPORT STAKE FOR PLANTS

SUMMARY OF THE INVENTION

This application is a continuation-in-part of U.S. application Ser. No. 320,139, filed 11/12/81, now abandoned.

This invention is directed to a support stake for plants and in particular to an extruded stake made of plastic, and to a method of making stakes.

BACKGROUND OF THE INVENTION

Many previous attempts have been made to provide practical stakes for use in supporting soft stemmed plants.

Widespread use is still made of wooden stakes for use with plants such as tomatoes, flowers and the like. However, wood is expensive, bulky and can break and inflicts splinters or slivers on the unwary user. Metal is practical to an extent but it is a high cost heavy item, subject to rust, expensive to transport in bulk, etc.

Other specialty stakes, such as that shown in U.S. Pat. No. 4,176,484 Boucher et al Dec. 4th, 1979 have been proposed, being of complex arrangement unsuited for low cost extruded production and being complicated by stem clips and the like.

Canadian Pat. No. 279,864 Effley et al, Apr. 24th, 1928 shows a metal stake of U-section having a complex adjustable securing ring for attachment of a plant to the stake;

U.S. Pat. No. 3,875,699 Lamarre et al, Apr. 8th, 1975 shows a plastic post having a hollow section with extending flanges for use as a grape stake, being notched to receive wire clips. German Pat. No. 1,962,305 shows a multi-lobed solid stake, wherein the lobes of the stake are slotted inwardly from the edges thereof, to permit the entry and engagement of string or wire ties within the slots.

In accordance with the present invention there is provided a lightweight stake having a solid lobed cross section possessed of a high stiffness, at least some of the lobes having serrated edges to promote the non-slippage of ties by means of which portions of plants are tied to the stake, the provision of multiple lobes serving to facilitate the attachment of more than one plant if desired, and promoting packaging and transportation by semi-nesting together of multiples of stakes into bundles.

The subject stake is particularly adapted to low cost, efficient production. The lobed solid cross-section may be readily extruded in a continuous length through a correspondingly shaped fixed die, and substantially simultaneously the edges of the lobe section are serrated by passing each edge against a coining disc so as to coin the desired indentations into each of the edges. Owing to the form of the stake, and the provision of serrated edges the stake can be extruded continuously and simultaneously serrated, followed by parting off into individual lengths and sharpening of the stakes. The preferred sharpening step comprises cutting the end of the stake conically to a point, using a rotating tool into which the stake is fed axially, to provide a symetrically sharpened end.

The present invention thus provides an extruded plastic stake having a plurality of substantially imperforate wing portions extending from a central core portion to thickened edges, and possessing a high stiffness modulus, the surfaces of the stake sides, viewed in section being inwardly curved to provide concave surfaces for receiving in use a portion of a plant in tied relation therein. In addition, the edges of the stake wing portions are serrated, to facilitate the tying of ties in substantially non-slipping relation with the stake. The provision of a cap at one end of the stake facilitates driving of the stake into the ground, the other end of the stake being sharpened. The end of the stake is provided with a centrally located point being sharpened conically, to facilitate straight penetration.

The form of the stake provides the following characteristics:

(1) Low weight-to-stiffness ratio;
(2) Low cross-sectional area facilitates driving into the ground;
(3) Cross sectional form adapted to production by extrusion;
(4) Tying serrations readily applied during extrusion process, also "break" the sharp edge and facilitate handling;
(5) Outwardly concave lobed surfaces tend to provide directionalized soil compaction to minimize loosening effect in the ground, with a diminished need for ground penetration;
(6) Lobed surface provides stem localization, with indirect tie forces to minimize stem damage, and
(7) The imperforate lobed surface makes for rapid, low-cost manufacture and promotes strength and easy cleaning.

The subject stake provides a durable, clean, low-cost, washable stake that is readily stored and transported. Colour may be added, at the preference of the user, using a stable plastic such as bottle compound. Owing to the vulnerability of PVC to ultraviolet degradation the use of reclaimed scrap is contemplated.

There is further provided the method of manufacturing a plastic stake by the extrusion of a lobed section, including serrating the edges of the section.

BRIEF DESCRIPTION OF THE DRAWINGS

Certain embodiments of the subject stake are shown in the accompanying drawings, wherein.

DETAILED DESCRIPTION OF THE DRAWINGS

Figure 1:
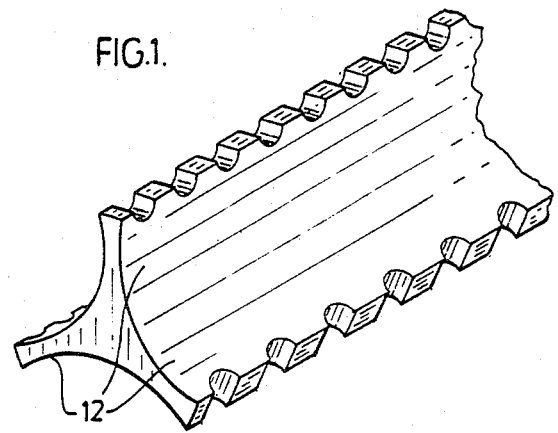
FIG. 1 is a general view showing a portion of a stake in accordance herewith.
Figure 2:
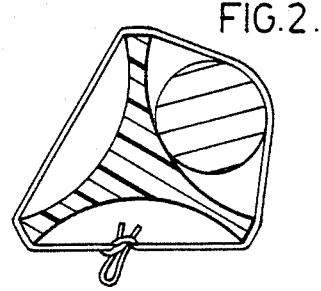
FIG. 2 is a schematic plan section showing a plant stem in tied relation with the subject stake.
Figure 3:
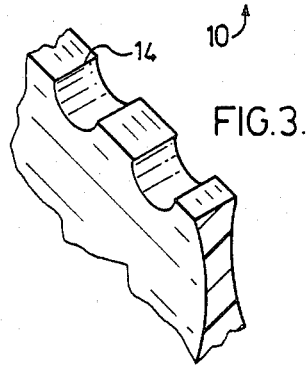
FIG. 3 is a scrap view showing a serrated lobe edge.

Referring to the drawings, FIG. 1 shows a 3-lobed stake embodiment 10, the lobes 12 thereof having serrated edges 14 (FIG. 3), generally applied as a coining operation, by rolling, immediately subsequent to the extrusion operation. The relative size of the serrations are somewhat exagerated.

Figure 7:
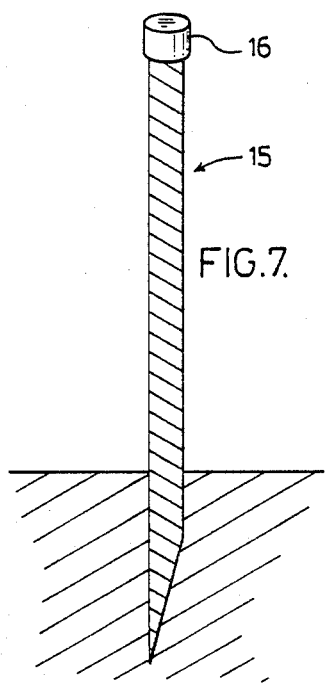
FIG. 7 shows the subject stake, complete with end cap and point, in ground-inserted relation.

FIG. 7 illustrates a stake 15 having a cylindrical end cap 16 and a pointed end 18 obtained by a point cutting operation.

Figure 4:
FIGS. 4, 5 and 6 show alternative embodiments.
Figure 5:
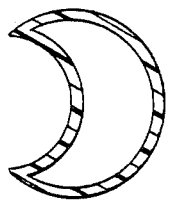
Figure 6:
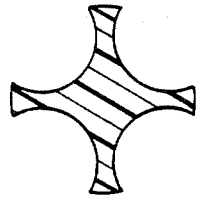

FIGS. 4 and 6 illustrate alternative four lobed embodiments. The FIG. 5 embodiment is contemplated as a more expensive specialty stake of limited application.

What I claim by Letters Patent of the United States is:

1. An extruded plastic stake having a solid homogeneous cross section with a pointed end portion at one end thereof and a hollow cylindrical driving cap at the other end, the balance of the length of the stake being of substantially uniform cross section having at least three extending wing portions providing longitudinally extending solid ribs encircled by said cap, said ribs having outwardly concave surfaces extending therebetween comprising longitudinally extending recesses to receive in use an object to be secured to the stake in located relation with a said recess, said solid cross section ensuring said point section being solid, to resist damage to the stake and facilitate penetration on being driven into the ground, said wing portions including thickened longitudinally extending edge portions having substantially arcuate edge surfaces, with a series of shallow serrations extending across said edge surfaces of at least one said wing portion to provide in use longitudinal locating engagement of said grooves with a tie member when wrapped in secured relation about the stake.

2. The stake as claimed in claim 1, said end portion being symetrically pointed.

3. The stake as set forth in claim 1 wherein all of said wing portions are provided with said shallow serrations across said edge surfaces.

* * * * *